Aug. 3, 1948.  A. C. FISCHER  2,446,509
PLANT COVER
Filed Sept. 17, 1943

Inventor
ALBERT C. FISCHER
By Knight Bros.
Attorney

Patented Aug. 3, 1948

2,446,509

UNITED STATES PATENT OFFICE 2,446,509

PLANT COVER

Albert C. Fischer, Chicago, Ill.

Application September 17, 1943, Serial No. 502,804

6 Claims. (Cl. 47—29)

This case is a continuation-in-part of my applications Serial No. 339,830, filed June 10, 1940, Patent No. 2,351,256, June 13, 1944, and Serial No. 344,452, filed July 8, 1940 (now abandoned), and relates to an article of manufacture for use in the treatment of vines, small fruit-bushes, shrubbery, trees, plants in general, and their blossoms, fruits and other parts thereof which may be subjected to treatment that will promote their development and relieve them from or protect them against parasitic, pathogenic, and other banal influences; and particularly treatment practiced through the medium of a cap, bag, envelope or other covering constructed of sheet material, preferably translucent, and applied over the whole plant, or any restricted part thereof during certain stages of plant growth, in a manner to destroy banal influences already colonized upon the plant before treatment is applied, or to exclude banal influences that may seek access to the plant in the course of its growth.

One object of the invention is to provide a cap, bag, envelope, or other covering of sheet-like material, for a plant or a portion of a plant, that will establish immediately around the plant or protected portion thereof, a confine bearing a volatile sterilizing medium and/or a soluble fertilizer, which said confine is penetrable to light rays beneficial to plant life and establishes around said plant or part an atmospheric environment substantially isolated from the atmosphere outside the confine, and gives off into suspension into the said isolated environment, a volatile sterilizing medium, aromatic parasite repelling medium, or other media capable of qualifying and neutralizing the said environment.

Another object of the invention is to provide a cap, bag, envelope or other covering of sheet material which, while enclosing and protecting the plant or portion thereof to be treated, will admit to the atmospheric environment and even into direct impingement upon the protected plant and plant portion, light rays supplied naturally by the sun, or artificially from some other source, having the capacity of promoting development of the plant or protected portion thereof; and particularly a cap, bag, envelope or other covering that is not only translucent or transparent, but carries as a coating or impregnation, soluble fertilizing and/or insecticide capable of functioning without defeating the light treatment of the plants.

Another object of the present invention is to provide in the form of a cap or other covering for a growing plant or portion thereof, a means for gradually feeding fertilizer or other soil treating media within the reach of the root system of the plant; and particularly a cap or other cover having applied upon its surface or impregnated in it, one or more soluble soil or plant treating media capable of being taken into solution from the cap or cover, by vehicular moisture, and guided by surface adhesion to, or saturation in, the cap or cover, to the ground, without dripping upon delicate leaves of the protected plant when such dripping would be detrimental; or accompanied by dripping upon the protected plant when desirable (as in case of an insecticide of appropriate formula) when the cap or cover is absorbent and has its under-surface designed to produce dripping.

Another object of the invention is to provide a cap or other covering capable of absorbing moisture from the surrounding atmosphere, or from water supplied in irrigation or sprinkling, which it may yield by sweating from its inner surface to maintain a moist environment around the plant or treated portion thereof.

The invention proceeds upon the principle of providing caps or the like over young plants during early stages of their growth when the plants are subject to attack from insects, spores of fungi, or other deleterious parasite influences, or bags, envelopes or other coverings for special portions of plants during pollenization of their blossoms, ripening of their fruit, or at other times when they need protection. Such caps, bags, envelopes or other coverings may be made of sheet material such as paper or fabric, and are constructed to maintain around the plants or protected portions thereof, separated air spaces, or environments of approximately isolated atmosphere. Also such sheet material may have applied to it colloidal or gelatinous filling material that serves as a vehicle for an anti-pathogenic medium, preferably aromatic or other volatile antiseptics not banal to plant life and capable of permeating, qualifying, sterilizing or disinfecting the isolated environments of the protected parts. These antiseptic agents destroy or render inert any germs of disease, spore of a fungus, or other deleterious influences that may have colonized upon the plant before the cover was applied. These antiseptic agents also render the sheet material transparent or translucent so that they are penetrable by rays of sunlight or artificial rays which promote growth of plants.

The present invention lends itself to realization, with especial advantage, of the invention set forth in my copending application based upon the principle of gradually feeding soil conditioning media to the root systems of plants, by applying the media as coatings upon or incorporating them as impregnating media in sheet-like, moisture-arresting septa, and dissolving the active principles of such media and conveying it from the septum by vehicular moisture.

Other objects and purposes will appear from the detailed description of the invention following hereinafter, taken in conjunction with the accompanying drawing, wherein Fig. 1 is a perspective view of a cap in accordance with the invention;

Figure 1:
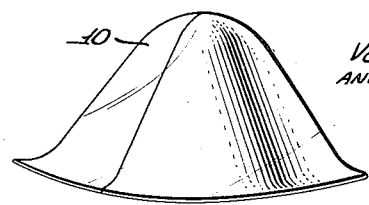

In Fig. 1 is shown a cap 10 which may be formed of tissue paper, fabric or heavier paper having pores therein to render the same penetrable by both light and moisture. The paper may be water pervious and treated with a chemical composition, for example, of a fatty character, to render it translucent. On the underside of this cap is a layer of fertilizing medium which is adapted to go into solution with the moisture of water penetrating the inside of the cap from the outside to form drops of fertilizing solution falling to the ground to fertilize the plant covered by the cap, as is more clearly shown in Fig. 2.

Figure 2:
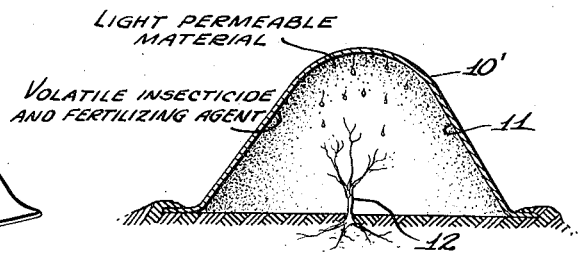
Fig. 2 is a vertical sectional view through another embodiment of the cap in accordance with the present invention.

In Fig. 2 the sheet of material 10' is likewise light permeable and penetrable by moisture. In this embodiment of the invention a volatile insecticide is combined with the fertilizing agent in the coating layer 11 to supplement the fertilizing action as described in connection with the embodiment shown in Fig. 1. Thereby protection is afforded to the plant 12 which is covered by the cap against the harmful influences of insect life while the same is fertilized.

Figure 3:
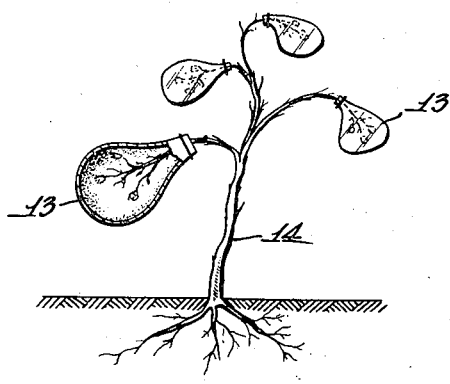
Fig. 3 is a front elevation with certain parts in section of protective caps applied to plants.

In Fig. 3 bags or enclosures 13, in the form of jackets of light permeable material, are shown applied to the twigs or buds of the plant 14. These bags are coated on the interior with a volatile insecticidal agent for lending an insect and spore repellent aroma to the isolated environment surrounding the buds sought to be protected.

Figure 4:
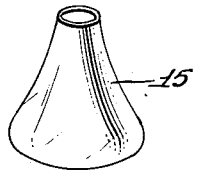
Figs. 4 and 4a are perspective views of different embodiments of bags or enclosures which may be used in the practice of the present invention.

Fig. 4 shows a light permeable bag or jacket 15, having a constricted opening, which may be conveniently applied to the end of a twig facilitating the stricture of the end of the bag around the tree while affording sufficient space for the growth of the buds beyond the critical stage.

Figure 4A:
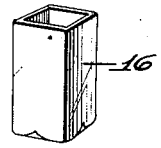

Fig. 4a shows a variation of the bag which may be applied to the portions of the plant sought to be protected. The interiors of enclosures 15 and 16 are coated with a suitable insecticidal agent which may yield its effective factors merely by permeation of the air and by the aid of moisture penetrating into the interior of these enclosures.

As variations of the covers specifically described above, these may be made of strips of sheet material inter alia; for instance a suitably treated arcuate strip of sheet material, of proper dimensions, translucent or non-translucent, adapted to be coiled into a truncated cone or a substantially complete cone and placed, tent-like, over a plant, or collar-like, around the stem of a plant. These arcuate or otherwise designed strips treated suitably to the aims of this invention may be sold in pads or blocks from which the strips may be individually taken and used as needed.

Among the materials that may enter into the material of the cap or other covering and lend itself to formation into sheet-like form to be thereafter fashioned from sheets or strips into caps, or other covers, or molded thereinto, may be mentioned gelatins, glues, agar-agar, gluten, treated kelp or other sea plants, flax and other vegetable seeds, and these materials will preferably be of colloidal consistency, and largely or wholly at least translucent if not transparent. These materials, or at least the ground contacting parts thereof may be filled with fibers of different kinds to lend strength to their structure and render them absorbent; for instance fibers supplied by crushed cotton seed hulls. The materials may also have incorporated in them soluble commercial or other fertilizers or solutions thereof; for instance, Vigoro, Loma, bone meal, etc., and they may be rendered non-drying or given lasting pliability by incorporating glycerine or other non-evaporative ingredients in them. To give them the capacity of asphyxiating insect life, or sterilizing spores of fungi, they may have incorporated in them aromatics or volatiles, such as camphor; creosote; carbolic acid, etc. They may also incorporate insect powders of a kind that is readily picked up by movement of the air and held in suspension thereby.

I claim:

1. A covering for a plant comprising an enclosure formed of a sheet of light-permeable material adapted to define, around at least part of the plant, an atmospheric environment that is isolated from the atmosphere surrounding said enclosure, said enclosure bearing on the interior surface thereof an aromatic treating ingredient which permeates the isolated environment, and said sheet of light-permeable material consisting of a water permeable fabric incorporating in addition water soluble soil treating ingredients.

2. A covering for a plant comprising an enclosure formed of a sheet of light-permeable material adapted to define, around at least part of the plant, an atmospheric environment that is isolated from the atmosphere surrounding said enclosure, said enclosure bearing on the interior surface thereof an aromatic treating ingredient which permeates the isolated environment, and said sheet of light-permeable material consisting of a water permeable fabric containing a hygroscopic colloid and a fertilizing medium.

3. A covering for a plant comprising an enclosure formed of a sheet of light-permeable material adapted to define, around at least part of the plant, an atmospheric environment that is isolated from the atmosphere surrounding said enclosure, said enclosure bearing on the interior surface thereof an aromatic treating ingredient which permeates the isolated environment, and said sheet of light-permeable material comprising a fertilizing agent in addition to the aromatic treating ingredient functioning as an insecticidal agent.

4. A covering for a plant comprising an enclosure formed of a sheet of water and light permeable material adapted to enclose a plant, said enclosure bearing on the interior surface thereof a soluble fertilizer medium which is dissolved by the moisture penetrating said covering and which drips in the droplets formed thereby to fertilize the ground beneath the covering and in which the plant is embedded.

5. A cover for a plant comprising porous fibrous material having light and moisture permeable characteristics and coated with a fertilizing agent on its underside adapted to be dissolved by the moisture reaching the interior surface of the material which accumulates thereat and forms droplets of fertilizing solution which gravitate to the ground below the cover to fertilize the plant embedded therein.

6. A translucent bag adapted for hybridizing and blossom protecting purposes which is adapted to house the blossom, having a coating on the interior of the bag which gives off antiseptic fumes destructive of insect life but harmless to plant life.

ALBERT C. FISCHER.

REFERENCES CITED

The following references are of record in the file of this patent:

UNITED STATES PATENTS

| Number | Name | Date |
|---|---|---|
| 327,510 | Anderson | Oct. 6, 1885 |
| 436,329 | Bass | Sept. 16, 1890 |
| 1,828,448 | Seidel | Oct. 20, 1931 |

FOREIGN PATENTS

| Number | Country | Date |
|---|---|---|
| 3,487 | Austria | Feb. 25, 1901 |
| 7,458 | Great Britain | 1888 |
| 16,835 | Great Britain | 1904 |
| 430,620 | Great Britain | June 21, 1935 |
| 537,153 | Germany | Oct. 29, |
| 44,527 | Netherlands | Nov. |

OTHER REFERENCES

Bureau of Plant Industry, Bul
Agr., 1910. Page 31.